US011161400B2

(12) United States Patent
Nuruki et al.

(10) Patent No.: US 11,161,400 B2
(45) Date of Patent: Nov. 2, 2021

(54) VEHICLE REAR STRUCTURE

(71) Applicant: TOYOTA JIDOSHA KABUSHIKI KAISHA, Toyota (JP)

(72) Inventors: Tetsuo Nuruki, Toyota (JP); Kohei Hisada, Nagoya (JP); Kazuki Otake, Toyota (JP); Takashi Matsui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/446,942

(22) Filed: Jun. 20, 2019

(65) Prior Publication Data
US 2020/0023724 A1    Jan. 23, 2020

(30) Foreign Application Priority Data
Jul. 18, 2018    (JP) .............................. JP2018-135256

(51) Int. Cl.
*B60K 1/00*    (2006.01)
*B60K 1/04*    (2019.01)
*B60L 50/60*    (2019.01)

(52) U.S. Cl.
CPC ................ *B60K 1/04* (2013.01); *B60L 50/66* (2019.02); *B60K 2001/0416* (2013.01)

(58) Field of Classification Search
CPC .... B60K 1/04; B60K 2001/0416; B60L 50/66
See application file for complete search history.

(56) References Cited

U.S. PATENT DOCUMENTS

| 7,396,075 | B2 * | 7/2008 | Ohkuma | .................. | B60N 2/36 |
| | | | | | 297/180.1 |
| 7,424,926 | B2 * | 9/2008 | Tsuchiya | ............. | H01M 2/1083 |
| | | | | | 180/68.5 |
| 7,568,755 | B2 * | 8/2009 | Imada | .................. | B62D 21/152 |
| | | | | | 296/187.11 |
| 7,690,686 | B2 * | 4/2010 | Hashimura | ............. | B60L 50/72 |
| | | | | | 280/782 |
| 7,815,250 | B2 * | 10/2010 | Oshio | .................... | B62D 35/02 |
| | | | | | 296/204 |
| 7,905,307 | B2 * | 3/2011 | Kubota | ................... | B60R 13/02 |
| | | | | | 180/68.1 |
| 7,913,788 | B1 * | 3/2011 | Bryer | .................. | B60K 15/063 |
| | | | | | 180/68.5 |

(Continued)

FOREIGN PATENT DOCUMENTS

| CN | 102448753 A | 5/2012 |
| JP | 2013-67327 | 4/2013 |
| JP | 2016-132400 | 7/2016 |

*Primary Examiner* — Hau V Phan
(74) *Attorney, Agent, or Firm* — Oblon, McClelland, Maier & Neustadt, L.L.P.

(57) ABSTRACT

A vehicle rear structure includes a battery outer case, a side frame provided in a side portion of the battery outer case and extending forward from a rear side of the battery outer case, a rear vehicle frame member provided behind the battery outer case and inwardly from an end of a vehicle body so as to extend in the vehicle front-rear direction, and a front vehicle frame member provided in front of the battery outer case so as to extend in the vehicle front-rear direction and being connected to a front end portion of the side frame. The rear vehicle frame member is connected to a rear end portion of the side frame.

8 Claims, 8 Drawing Sheets

(56) References Cited

U.S. PATENT DOCUMENTS

| | | | | |
|---|---|---|---|---|
| 8,356,852 B2* | 1/2013 | Lucas | | B60R 9/065 |
| | | | | 296/37.1 |
| 8,567,543 B2* | 10/2013 | Kubota | | B60K 6/40 |
| | | | | 180/68.5 |
| 8,728,648 B2* | 5/2014 | Choo | | H01M 2/1077 |
| | | | | 429/100 |
| 8,888,572 B2* | 11/2014 | Nakamura | | H01M 10/613 |
| | | | | 454/69 |
| 8,993,142 B2* | 3/2015 | Sakai | | B60L 50/52 |
| | | | | 429/61 |
| 9,166,258 B2* | 10/2015 | Takizawa | | H01M 10/6563 |
| 9,308,805 B2* | 4/2016 | Shiromura | | B60L 50/64 |
| 9,643,516 B2* | 5/2017 | Hirota | | B60L 3/0007 |
| 2006/0289224 A1* | 12/2006 | Ono | | B60K 1/04 |
| | | | | 180/311 |
| 2007/0215399 A1* | 9/2007 | Watanabe | | B60L 50/66 |
| | | | | 180/68.5 |
| 2008/0196957 A1* | 8/2008 | Koike | | B60L 50/66 |
| | | | | 180/68.5 |
| 2010/0307848 A1* | 12/2010 | Hashimoto | | B60L 50/64 |
| | | | | 180/68.5 |
| 2011/0180339 A1* | 7/2011 | Kawamura | | B60L 50/61 |
| | | | | 180/65.245 |
| 2011/0284299 A1* | 11/2011 | Takahashi | | H01M 50/20 |
| | | | | 180/65.21 |
| 2012/0055725 A1* | 3/2012 | Mizoguchi | | H01M 10/6554 |
| | | | | 180/68.5 |
| 2013/0020139 A1* | 1/2013 | Kim | | B60K 1/04 |
| | | | | 180/68.5 |
| 2013/0161106 A1* | 6/2013 | Iwai | | H01M 2/1083 |
| | | | | 180/68.5 |
| 2014/0008137 A1* | 1/2014 | Shiromura | | B60L 58/21 |
| | | | | 180/68.5 |
| 2014/0338999 A1* | 11/2014 | Fujii | | B60L 50/66 |
| | | | | 180/68.5 |
| 2017/0174064 A1* | 6/2017 | Shinoda | | B62D 29/043 |
| 2017/0352929 A1* | 12/2017 | Yasuda | | H01M 10/617 |
| 2018/0015806 A1* | 1/2018 | Yasuda | | B60H 1/00385 |

* cited by examiner

VEHICLE REAR STRUCTURE

INCORPORATION BY REFERENCE

The disclosure of Japanese Patent Application No. 2018-135256 filed on Jul. 18, 2018 including the specification, drawings and abstract is incorporated herein by reference in its entirety.

BACKGROUND

1. Technical Field

The disclosure relates to a vehicle rear structure.

2. Description of Related Art

In an electric vehicle or the like, a battery outer case in which a battery is accommodated is disposed on the rear side of a stepped portion in the vehicle front-rear direction and below a floor panel (a rear panel) in the vehicle up-down direction, the stepped portion being provided in a rear part of the floor panel in the vehicle front-rear direction. The battery outer case is attached to a rear side member, a floor cross-member, or the like via a bracket or the like.

A rear end of the rear side member is connected to a rear bumper, and the front side of the rear side member in the vehicle front-rear direction bends outwardly in the vehicle width direction so as to be connected to a rocker disposed in an end of the floor panel in the vehicle width direction.

In the meantime, the electric vehicle largely increases in mass due to the battery being provided therein. Accordingly, when a collision load is transmitted from the bumper to the rocker on the front side in the vehicle front-rear direction via the rear side member at the time of a rear end collision of the vehicle, a large rotational moment is applied to a bent portion of the rear side member, and the bent portion might deform. When the bent portion in a vehicle body deforms, the battery outer case (or the battery accommodated therein) might be damaged.

In order to restrain such a damage of the battery outer case, it is desired that deformation of a part of the vehicle body around the battery outer case be restrained. However, when the rigidity of the vehicle body is to be improved by reinforcing the part around the battery outer case, the mass of the vehicle body largely increases.

Note that Japanese Unexamined Patent Application Publication No. 2013-67327 (JP 2013-67327 A) describes a configuration in which: a battery outer case having a rectangular shape in a plan view is provided with a flange portion provided around the outer periphery of the battery outer case such that a rear flange portion on the rear side in the vehicle front-rear direction is connected to a rear panel, and a front flange portion on the front side in the vehicle front-rear direction is connected to a rear end, in the vehicle front-rear direction, of a tunnel portion of a floor panel.

SUMMARY

Even in the configuration of JP 2013-67327 A, there is room for improvement to restrain deformation of the part around the battery outer case. That is, it is demanded to more efficiently transmit a collision load from a part behind the battery outer case in the vehicle front-rear direction to a part in front of the battery outer case in the vehicle front-rear direction at the time of a rear end collision of a vehicle.

The disclosure provides a vehicle rear structure that efficiently transmits a collision load to a part behind a battery outer case in the vehicle front-rear direction to a part in front of the battery outer case in the vehicle front-rear direction at the time of a rear end collision of a vehicle.

A first aspect of the disclosure relates to a vehicle rear structure. The vehicle rear structure includes a battery outer case, a side frame, a rear vehicle frame member, and a front vehicle frame member. The battery outer case is disposed on the rear side of a floor panel in the vehicle front-rear direction and below the floor panel in the vehicle up-down direction. The side frame is provided in a side portion of the battery outer case in the vehicle width direction so as to be integrated with the battery outer case, the side frame extending forward from the rear side of the battery outer case in the vehicle front-rear direction. The rear vehicle frame member is provided behind the battery outer case in the vehicle front-rear direction and inwardly from an end of a vehicle body in the vehicle width direction so as to extend in the vehicle front-rear direction, the rear vehicle frame member being connected to a rear end portion of the side frame in the vehicle front-rear direction. The front vehicle frame member is provided in front of the battery outer case in the vehicle front-rear direction so as to extend in the vehicle front-rear direction, the front vehicle frame member being connected to a front end portion of the side frame in the vehicle front-rear direction.

In the first aspect, the side frame extending in the vehicle front-rear direction is provided in the side portion of the battery outer case so as to be integrated with the battery outer case. The battery outer case is disposed on the rear side of the floor panel in the vehicle front-rear direction and below the floor panel in the vehicle up-down direction. The rear end portion of the side frame is connected to the rear vehicle frame member provided behind the battery outer case in the vehicle front-rear direction so as to extend in the vehicle front-rear direction, and the front end portion of the side frame is connected to the front vehicle frame member provided in front of the battery outer case in the vehicle front-rear direction so as to extend in the vehicle front-rear direction.

Accordingly, in the first aspect, when a collision load is input into the rear vehicle frame member from the rear side toward the front side in the vehicle front-rear direction due to a rear end collision of a vehicle, the collision load is transmitted, via the side frame provided in the side portion of the battery outer case, to the front vehicle frame member provided in front of the battery outer case in the vehicle front-rear direction so as to extend in the vehicle front-rear direction.

That is, by newly forming a load transmission passage through which a collision load is transmitted from a part behind the battery outer case in the vehicle front-rear direction to a part in front of the battery outer case in the vehicle front-rear direction at the time of a rear end collision of the vehicle, the collision load can be efficiently transmitted to the part in front of the battery outer case in the vehicle front-rear direction, thereby making it possible to prevent or restrain deformation of a part of the vehicle body around the battery outer case.

Further, with the first aspect, a collision load can be efficiently transmitted from the part behind the battery outer case in the vehicle front-rear direction to the part in front of the battery outer case in the vehicle front-rear direction at the time of a rear end collision of the vehicle.

In the first aspect, the front vehicle frame member may be an underfloor reinforcement placed below the floor panel in the vehicle up-down direction.

In the above configuration, the underfloor reinforcement provided in front of the battery outer case in the vehicle front-rear direction and inwardly from the end of the floor panel in the vehicle width direction so as to extend in the vehicle front-rear direction may be connected to the rear vehicle frame member via the side frame. Accordingly, in the above configuration, a collision load input into the rear vehicle frame member from the rear side in the vehicle front-rear direction at the time of a rear end collision of the vehicle is efficiently transmitted to the underfloor reinforcement via the side frame.

Particularly, the rear vehicle frame member may be placed inwardly in the vehicle width direction from the end of the vehicle body in the vehicle width direction, and the underfloor reinforcement may be also placed inwardly from the end of the floor panel in the vehicle width direction. That is, members from the rear vehicle frame member to the underfloor reinforcement via the side frame may be formed generally linearly in a plan view (a bottom view), and therefore, a collision load is still more efficiently transmitted from the rear vehicle frame member to the underfloor reinforcement.

In the first aspect, the front vehicle frame member may be a rocker provided in an end of the floor panel in the vehicle width direction.

In the above configuration, the rear vehicle frame member provided inwardly from an end of the vehicle body in the vehicle width direction so as to extend in the vehicle front-rear direction may be connected, via the side frame provided in an end of the battery outer case, to the rocker provided in front of the battery outer case in the vehicle front-rear direction and provided in an end of the floor panel in the vehicle width direction so as to extend in the vehicle front-rear direction.

Accordingly, with the above configuration, a collision load input into the rear vehicle frame member from the rear side in the vehicle front-rear direction at the time of a rear end collision of the vehicle is efficiently transmitted to the rocker via the side frame.

Further, the side frame is provided to be inclined outwardly in the vehicle width direction from the rear side toward the front side in the vehicle front-rear direction in a plan view, so that the capacity of the battery outer case with which the side frame is provided integrally can be increased.

In the first aspect, the rear vehicle frame member may be a rear side member. The rear side member may include a forward extending portion provided inwardly from the end of the vehicle body in the vehicle width direction so as to extend forward in the vehicle front-rear direction from a rear bumper, and an inclined extending portion extending from the front end portion of the forward extending portion in the vehicle front-rear direction so as to be inclined outwardly in the vehicle width direction forward in the vehicle front-rear direction. A front end portion of the forward extending portion may be connected to the rear end portion of the side frame in the vehicle front-rear direction. A front end portion of the inclined extending portion in the vehicle front-rear direction may be connected to the rear side of a rocker provided in an end of the floor panel in the vehicle width direction.

In the above configuration, the rear vehicle frame member may be the rear side member. The rear side member may include the forward extending portion provided inwardly from the end of the vehicle body in the vehicle width direction so as to extend forward in the vehicle front-rear direction from the rear bumper, and the inclined extending portion extending from the front end portion of the forward extending portion in the vehicle front-rear direction so as to be inclined outwardly in the vehicle width direction toward the front side in the vehicle front-rear direction. The front end portion of the forward extending portion may be connected to the rear end portion of the side frame in the vehicle front-rear direction. The front end portion of the inclined extending portion in the vehicle front-rear direction may be connected to the rear side of the rocker provided in the end of the floor panel in the vehicle width direction.

Accordingly, in the above configuration, when a collision load is input into the rear side member from the rear side in the vehicle front-rear direction at the time of a rear end collision of the vehicle, the collision load is transmitted to the rocker via the forward extending portion and the inclined extending portion of the rear side member, and the collision load is also transmitted to the front vehicle frame member via the forward extending portion of the rear side member and the side frame. That is, the collision load is efficiently transmitted from the part behind the battery outer case in the vehicle front-rear direction to the part in front of the battery outer case in the vehicle front-rear direction via two load transmission passages.

In the first aspect, the vehicle rear structure may include a pair of the rocker. A cross-member having two ends may be provided in front of the battery outer case in the vehicle front-rear direction. One of the two ends of the cross-member may be connected to one of the rockers, and the other of the two ends of the cross-member may be connected to the other one of the rockers.

In the above configuration, in a plan view of the vehicle, a generally triangular part may be formed, on the side portion of the battery outer case in the vehicle width direction, by the side frame, the inclined extending portion of the rear side member, the rocker, and the cross-member. Accordingly, the vehicle body rigidity improves, so that the protection performance of the battery outer case with respect to a side collision improves.

Further, in the above configuration, the battery protection performance at the time of a side collision improves.

In the first aspect, the battery outer case may be attached to the vehicle body via the side frame.

In the above configuration, the front end portion, in the vehicle front-rear direction, of the side frame formed integrally with the battery outer case may be connected to the front vehicle frame member, and the rear end portion, in the vehicle front-rear direction, of the side frame may be connected to the rear vehicle frame member. That is, the battery outer case may be attached to the vehicle body via the side frame, the front vehicle frame member, and the rear vehicle frame member. Accordingly, in the above configuration, the battery outer case does not require a bracket or the like via which the battery outer case is attached to the vehicle body.

Further, in the above configuration, the side frame is usable to attach the battery to the vehicle body, so that other brackets and the like are not required.

In the first aspect, a battery may be accommodated inside the battery outer case.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

The following describes a vehicle rear structure according to a first embodiment of the disclosure with reference to FIGS. 1 to 6. A vehicle framework structure on a bottom face of a vehicle body will be described first, and then, the vehicle rear structure around a battery outer case will be described. Note that, in the figures, an arrow FR indicates the front side in the vehicle front-rear direction, an arrow UP indicates the upper side in the vehicle up-down direction, an arrow LH indicates the left side in the vehicle width direction that is a side in the vehicle width direction, and an arrow RH indicates the right side in the vehicle width direction that is the other side in the vehicle width direction. Hereinafter, in a case where a description is made by use of merely directions of front and rear and directions of up and down, they are based on the vehicle front-rear direction and the vehicle up-down direction, respectively.

Configuration

Schematic Structure of Vehicle Bottom Face

Figure 1:
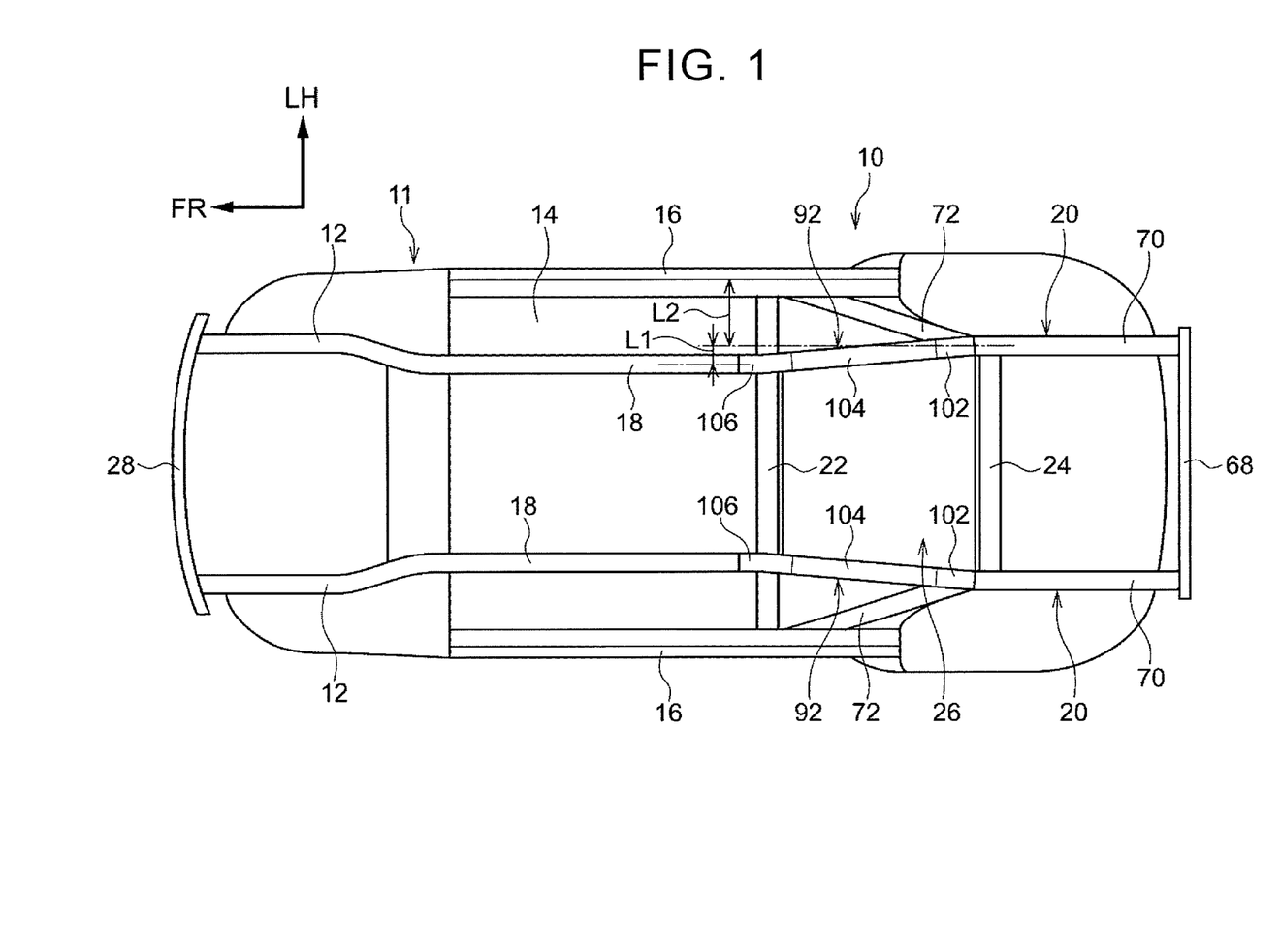
FIG. 1 is a bottom view schematically illustrating a vehicle rear structure according to a first embodiment of the disclosure.
Figure 2:
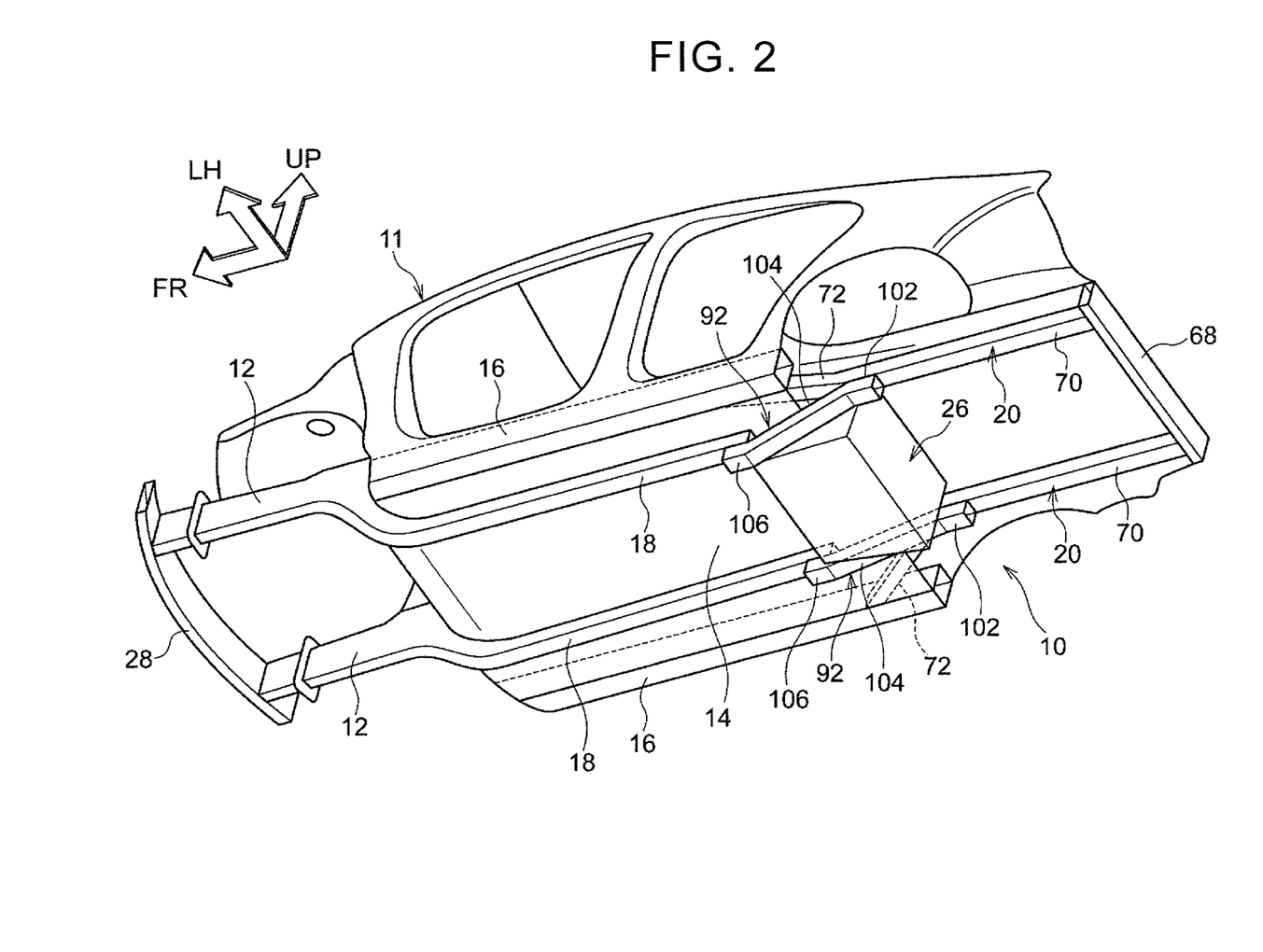
FIG. 2 is a perspective view schematically illustrating the vehicle rear structure according to the first embodiment of the disclosure.

FIG. 1 is a bottom view schematically illustrating a vehicle framework structure including a vehicle rear structure 10, and FIG. 2 is a perspective view schematically illustrating the vehicle framework structure on a bottom face of a vehicle body.

The following will first schematically describe a configuration of a whole bottom face of a vehicle. As illustrated in FIGS. 1 and 2, a vehicle body 11 includes: a pair of front side members 12 placed on the front side in the vehicle front-rear direction and extending in the vehicle front-rear direction; a pair of rockers 16 provided such that the rockers 16 are disposed on the opposite ends of a floor panel 14 in the vehicle width direction so as to extend in the vehicle front-rear direction; a pair of underfloor reinforcements (hereinafter referred to as "underfloor R/F") 18 provided below the floor panel 14 in the vehicle up-down direction and inwardly in the vehicle width direction from the opposite ends of the floor panel 14 in the vehicle width direction so as to extend in the vehicle front-rear direction; and a pair of rear side members 20 placed below the floor panel 14 in the vehicle up-down direction and on the rear side of the floor panel 14 in the vehicle front-rear direction so as to extend in in the vehicle front-rear direction.

Further, the vehicle body 11 includes a first cross-member 22 disposed in a kick-up portion that is a stepped portion of the floor panel 14 so as to extend between the rockers 16 in the vehicle width direction, and a second cross-member 24 provided behind the first cross-member 22 in the vehicle front-rear direction so as to extend between the rear side members 20 in the vehicle width direction.

Further, in the vehicle body 11, a battery outer case 26 is disposed between the first cross-member 22 and the second cross-member 24, below the floor panel 14 in the vehicle up-down direction.

The front side member 12 is a vehicle frame member having a closed section structure extending in the vehicle front-rear direction on the front side of the vehicle body 11 in the vehicle front-rear direction. A front end portion of the front side member 12 in the vehicle front-rear direction (hereinafter referred to as the "front end portion") is connected to a front bumper 28 extending in the vehicle width direction in a vehicle front portion, and a rear end portion of the front side member 12 in the vehicle front-rear direction (hereinafter referred to as the "rear end portion") is connected to a front end portion of the underfloor R/F 18.

Figure 6:
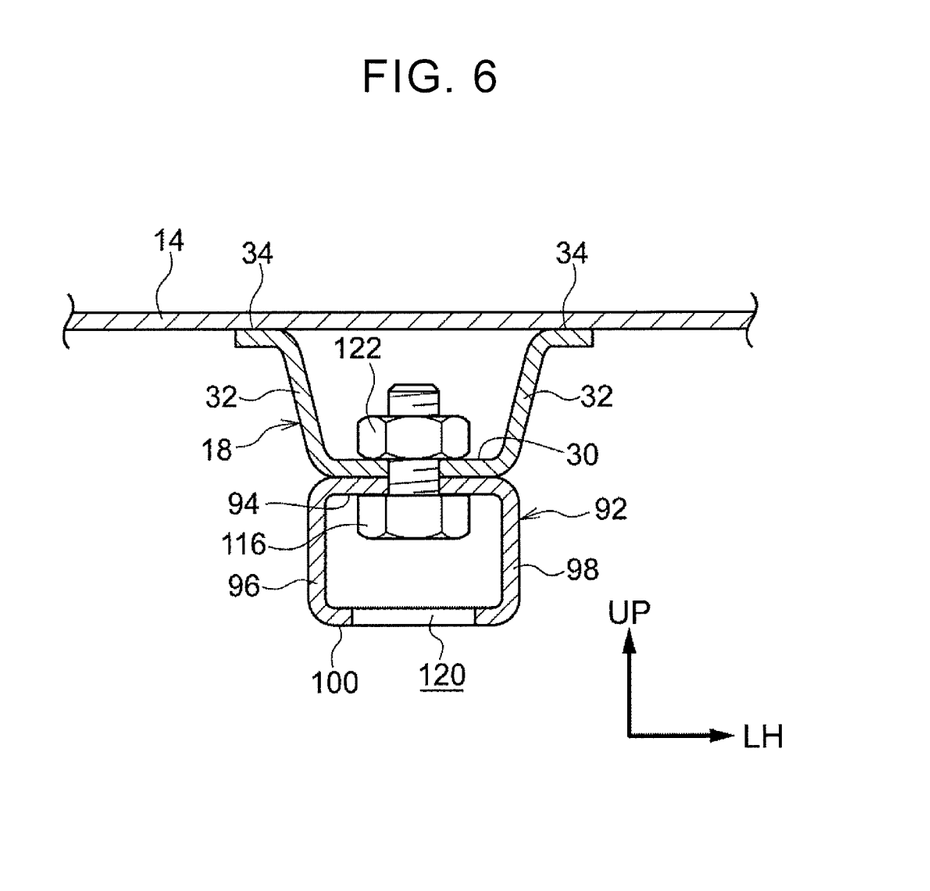
FIG. 6 is a sectional view corresponding to a position of a line VI-VI in FIG. 4.

As illustrated in FIGS. 1, 2, the underfloor R/F 18 is provided below the floor panel 14 and inwardly in the vehicle width direction from a corresponding one of the opposite ends of the floor panel 14 in the vehicle width direction so as to extend in the vehicle front-rear direction. As illustrated in FIG. 6, the underfloor R/F 18 has a hat sectional shape in the vehicle width direction so as to be opened upward in the vehicle up-down direction and includes a top wall 30 extending in the vehicle width direction, a pair of inclined walls 32 provided such that the inclined walls 32 extend upward in the vehicle up-down direction from the opposite ends of the top wall 30 in the vehicle width direction, and a pair of flange portions 34 provided such that one of the flange portions 34 extends inwardly in the vehicle width direction from an upper end portion of a corresponding one of the inclined walls 32 in the vehicle up-down direction (hereinafter referred to as the "upper end portion") and the other one of the flange portions 34 extends outwardly in the vehicle width direction from an upper end portion of a corresponding one of the inclined walls 32. The underfloor R/F 18 is a vehicle frame member having a closed-section structure such that the flange portions 34 are joined to a bottom face of the floor panel 14.

The front end portion of the underfloor R/F 18 is connected to the rear end portion of the front side member 12, and a rear end portion of the underfloor R/F 18 is connected to the first cross-member 22. Further, the vicinity of the rear end portion of the underfloor R/F 18 is connected to a front end portion of a corresponding one of side frames 92 (described later) provided in the opposite ends of the battery outer case 26 in the vehicle width direction.

The rockers 16 are provided in the opposite ends of the floor panel 14 in the vehicle width direction so as to extend in the vehicle front-rear direction. The first cross-member 22 extending in the vehicle width direction between the rockers 16 is disposed on the rear side of the kick-up portion of the floor panel 14 in the vehicle front-rear direction.

Figure 8:
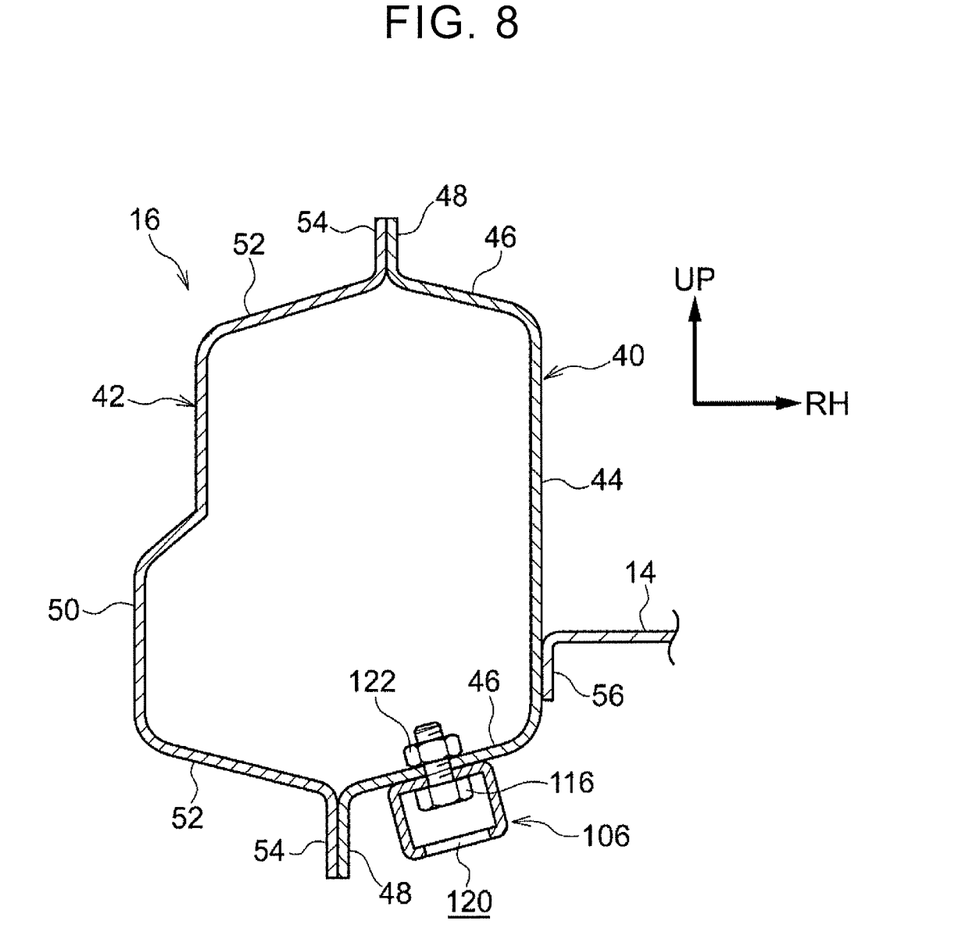
FIG. 8 is a sectional view taken along a line VIII-VIII in FIG. 7.

As illustrated in FIG. 8, the rocker 16 includes a rocker inner panel 40 placed on the inner side in the vehicle width direction, and a rocker outer panel 42 placed on the outer side in the vehicle width direction. Note that FIG. 8 corresponds to a second embodiment, but the rocker 16 has the same shape as that in the second embodiment, so the rocker 16 will be described with reference to FIG. 8.

The rocker inner panel 40 has a hat-shaped section in the vehicle width direction so as to be opened outwardly in the vehicle width direction, and includes a top wall 44 extending in the vehicle up-down direction, inclined walls 46 extending outward in the vehicle width direction from the opposite ends of the top wall 44 in the vehicle up-down direction, and flange portions 48 provided such that one of the flange portions 48 extends upward in the vehicle up-down direction from an outer end portion, in the vehicle width direction, of a corresponding one of the inclined walls 46 and the other one of the flange portions 48 extends downward in the vehicle up-down direction from an outer end portion, in the vehicle width direction, of a corresponding one of the inclined walls 46. Similarly to the rocker inner panel 40, the rocker outer panel 42 also has a hat-shaped section in the vehicle width direction so as to be opened inwardly in the vehicle width direction and includes a top wall 50, inclined walls 52, and flange portions 54. The rocker 16 is a vehicle frame member having a closed sectional structure by joining the flange portions 48 of the rocker inner panel 40 to the flange portions 54 of the rocker outer panel 42.

Note that a flange portion 56 provided in each end of the floor panel 14 in the vehicle width direction so as to extend downward in the vehicle up-down direction is joined to the top wall 44 of the rocker inner panel 40.

Figure 5:
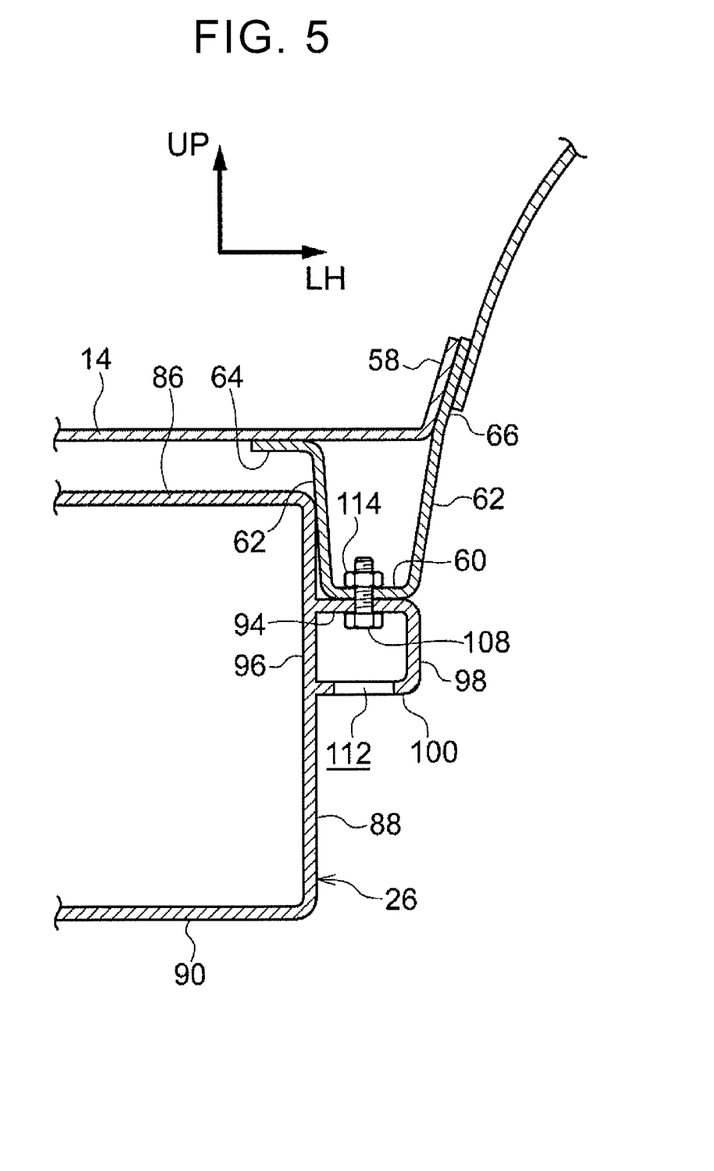
FIG. 5 is a sectional view corresponding to a position of a line V-V in FIG. 4.

As illustrated in FIGS. 1 and 2, the rear side member 20 is provided on the rear side of the vehicle body 11 in the vehicle front-rear direction and inwardly in the vehicle width direction from a corresponding one of the opposite ends of the vehicle body 11 in the vehicle width direction so as to extend in the vehicle front-rear direction. As illustrated in FIG. 5, the rear side member 20 has as generally hat-shaped section that is opened upward in the vehicle up-down direction and includes: a top wall 60 extending in the vehicle width direction; a pair of inclined walls 62 provided such that the inclined walls 62 extend upward in the vehicle up-down direction from the opposite ends of the top wall 60 in the vehicle width direction; a flange portion 64 extending inwardly in the vehicle width direction from an upper end portion of the inclined wall 62 on the inner side in the vehicle width direction; and a flange portion 66 extending further upward in the vehicle up-down direction from an upper end portion of the inclined wall 62 on the outer side in the vehicle width direction.

As illustrated in FIGS. 1, 2, the rear side member 20 is configured such that the flange portion 64 is joined to the bottom face of the floor panel 14, and the flange portion 66 is joined to a flange portion 58 extending upward in the vehicle up-down direction from a corresponding one of the opposite ends of the floor panel 14 in the vehicle width direction. Hereby, the rear side member 20 is provided as a vehicle frame member having a closed-section structure.

Note that a rear end portion of the rear side member 20 is connected to a rear bumper 68 extending in the vehicle width direction. Further, the rear side member 20 includes a forward extending portion 70 extending forward in the vehicle front-rear direction from the rear bumper 68 to a position in front of the second cross-member 24, and an inclined extending portion 72 extending forward in the vehicle front-rear direction from a front end of the forward extending portion 70 in a direction inclined outwardly in the vehicle width direction such that a front end of the inclined extending portion 72 is connected to the rocker 16. Note that a front end portion of the forward extending portion 70 is connected to a rear end portion of the side frame 92 (described later).

Structure Around Battery Outer Case

Next, a structure around the battery outer case 26 will be described more specifically.

Figure 3:
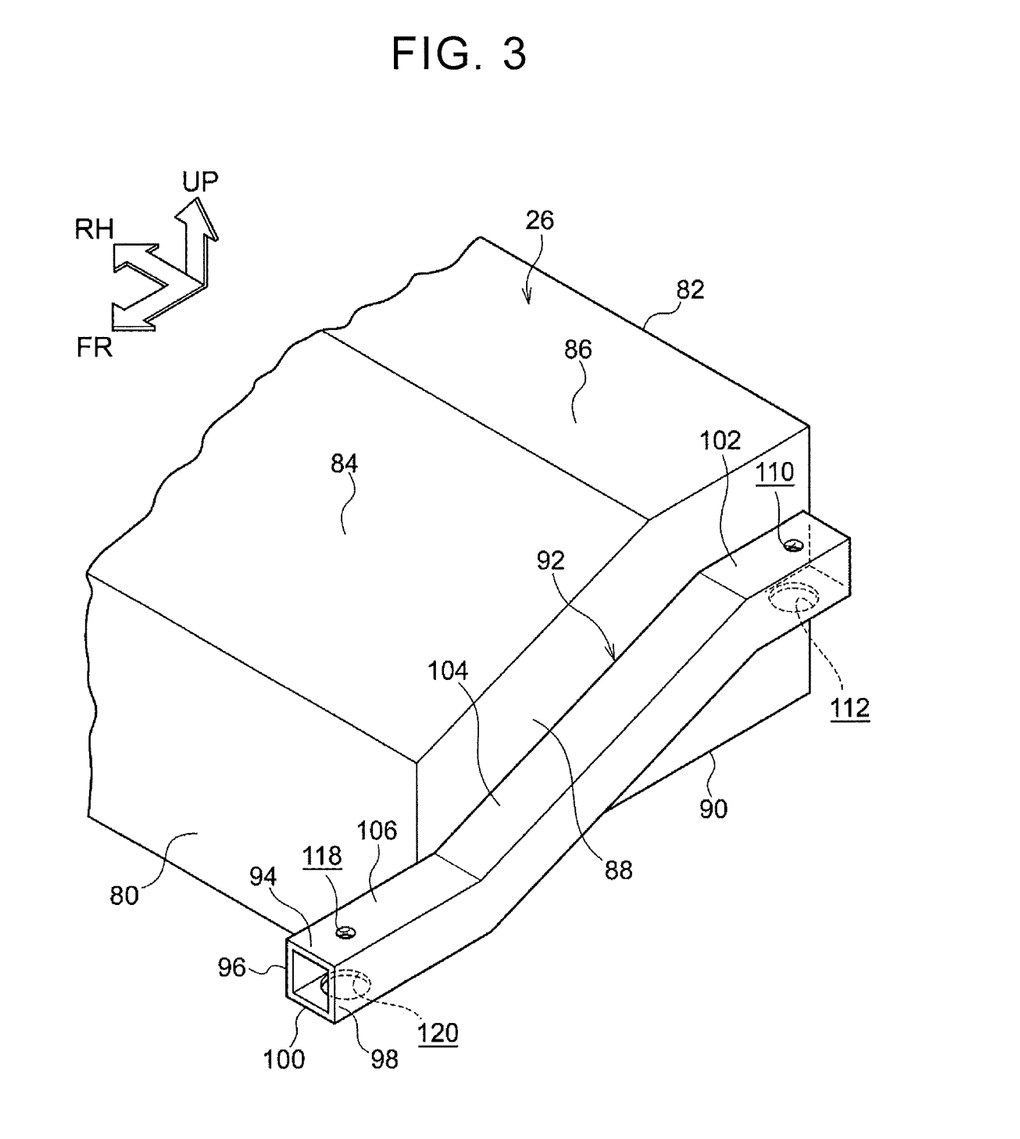
FIG. 3 is a perspective view illustrating a battery outer case and a side frame according to the first embodiment of the disclosure.

As illustrated in FIGS. 2 and 3, the battery outer case 26 has a generally rectangular shape. As illustrated in FIG. 1, the battery outer case 26 has a trapezoidal shape in which the front side in the vehicle front-rear direction (the width of a front wall 80 in the vehicle width direction) is narrower than the rear side in the vehicle front-rear direction (the width of a rear wall 82 in the vehicle width direction), in a plan view (a bottom view).

Figure 4:
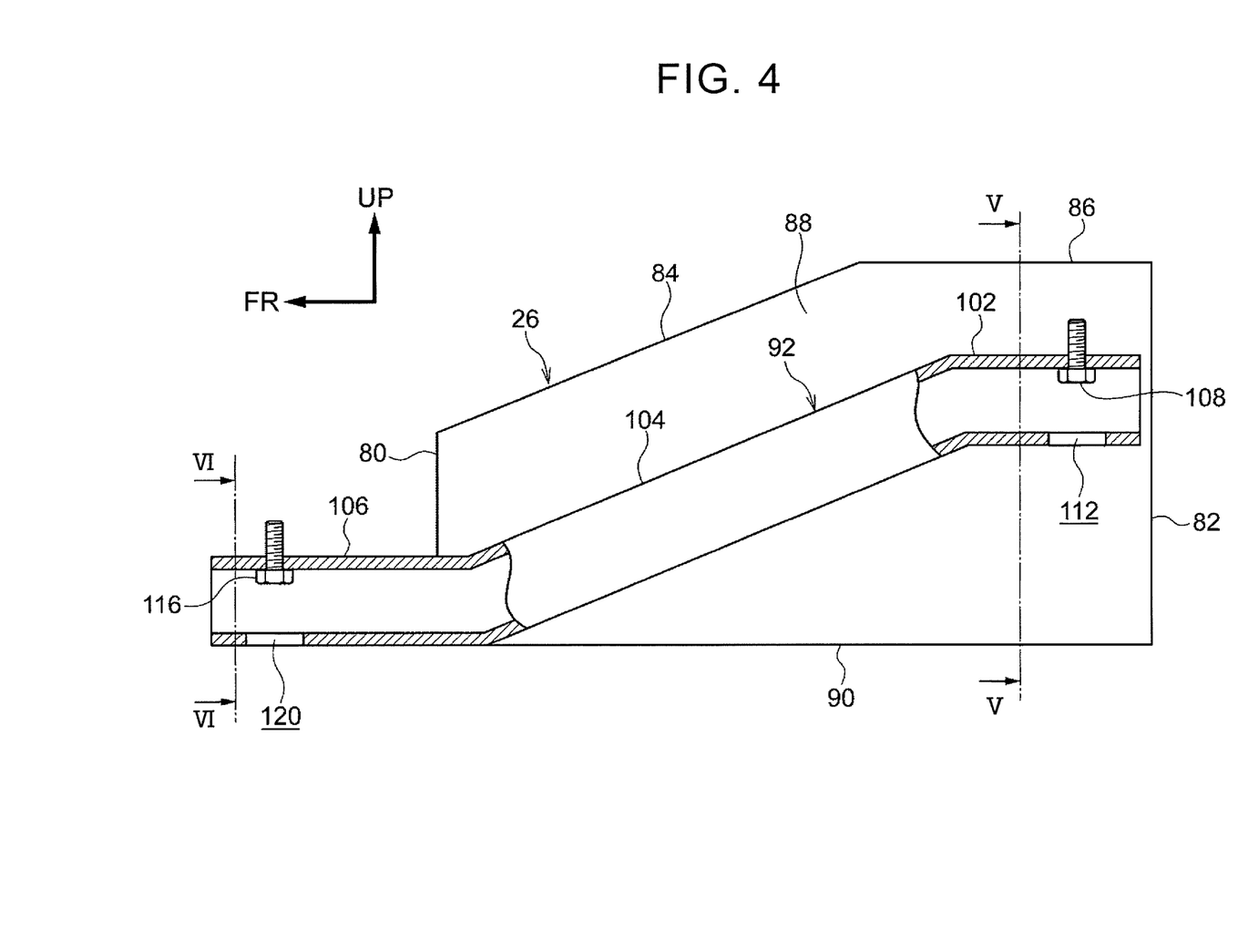
FIG. 4 is a partially cut side view illustrating the battery outer case and the side frame according to the first embodiment of the disclosure.

Further, as illustrated in FIGS. 3 and 4, on a top face of the battery outer case 26, an inclined wall 84 formed on the front side of the top face in the vehicle front-rear direction along the shape of the floor panel 14 so as to be inclined upward in the vehicle up-down direction toward the rear side in the vehicle front-rear direction, and a horizontal wall 86 continuous with a rear end portion of the inclined wall 84 so as to extend rearward in the vehicle front-rear direction are formed.

Further, as illustrated in FIG. 1, a pair of side walls 88 is provided such that the side walls 88 are provided in the opposite ends of the battery outer case 26 in the vehicle width direction, and the side walls 88 are formed so as to be inclined inwardly in the vehicle width direction toward the front side in the vehicle front-rear direction.

Note that a bottom wall 90 of the battery outer case 26 is a horizontal surface.

The side walls 88 of the battery outer case 26 are respectively provided with the side frames 92 formed to project outward in the vehicle width direction. The side frames 92 are formed integrally with the battery outer case 26. The battery outer case 26 and the side frames 92 may be integrally made of a metallic material such as steel or aluminum or resin such as CFRP, or they may be formed separately and integrated with each other by joining or the like.

As illustrated in FIGS. 3 and 5, the side frame 92 has a closed section structure having a generally square section and includes an upper wall 94, an inner wall 96 on the inner side in the vehicle width direction, an outer wall 98 on the outer side in the vehicle width direction, and a bottom wall 100. Note that, as illustrated in the present embodiment, in a case where the battery outer case 26 is formed integrally with the side frame 92, the side wall 88 of the battery outer case 26 partially constitutes the inner wall 96, as illustrated in FIG. 5. Further, as illustrated in FIGS. 3 and 4, the side frame 92 includes a rear connecting portion 102 provided on the rear end side of the side wall 88 so as to be placed slightly on the upper side in the vehicle up-down direction and extend in the vehicle front-rear direction, an inclined portion 104 inclined downward in the vehicle up-down direction toward the front side in the vehicle front-rear direction from a front end of the rear connecting portion 102, and a front connecting portion 106 extending forward in the vehicle front-rear direction from a front end of the inclined portion 104.

As illustrated in FIG. 3, in the rear connecting portion 102, the upper wall 94 has an insertion hole 110 through which a bolt 108 (see FIG. 5) to be tightened to the rear side member 20 is passed, and the bottom wall 100 has a tool hole 112 into which a tool is inserted.

Accordingly, as illustrated in FIG. 5, the battery outer case 26 is placed below the floor panel 14 in the vehicle up-down direction, the upper wall 94 in the rear connecting portion 102 of the side frame 92 is brought into contact with a bottom face of the top wall 60 of the forward extending portion 70 of the rear side member 20, and the bolt 108 is passed through the insertion hole 110 of the upper wall 94 and a hole (not shown) of the top wall 60 and tightened to a weld nut 114, so that the rear side member 20 is connected to the side frame 92.

In the meantime, as illustrated in FIGS. 3 and 4, the front connecting portion 106 extends to a position in front of a front end of the side wall 88 in the vehicle front-rear direction. As a result, a front end of the front connecting portion 106 is placed below a rear end of the underfloor R/F 18 (see FIG. 2), in front of the first cross-member 22 in the vehicle front-rear direction (see FIG. 1).

As illustrated in FIG. 3, in the front connecting portion 106, the upper wall 94 has an insertion hole 118 through which a bolt 116 (see FIG. 6) to be tightened to the underfloor R/F 18 is passed, and the bottom wall 100 has a tool hole 120 into which a tool is inserted at the time of tightening.

Accordingly, the upper wall 94 in the front connecting portion 106 of the side frame 92 is brought into contact with a bottom face of the top wall 30 of the underfloor R/F 18, and the bolt 116 is passed through the insertion hole 118 of the upper wall 94 and a hole (not shown) of the top wall 30 and tightened to a weld nut 122, so that the side frame 92 is connected to the underfloor R/F 18.

Hereby, as illustrated in FIG. 1, the vehicle frame members from the forward extending portion 70 of the rear side member 20 to the front side member 12 via the side frame 92 and the underfloor R/F 18 are connected to each other generally linearly in a bottom view of the vehicle.

Operation

The operation of the vehicle rear structure 10 configured as such will be described below.

In the vehicle rear structure 10, the side frame 92 is provided on the side wall 88 of the battery outer case 26, and the forward extending portion 70, of the rear side member 20, provided behind the battery outer case 26 in the vehicle front-rear direction so as to extend in the vehicle front-rear direction is connected, via the side frame 92, to the underfloor R/F 18 provided in front of the battery outer case 26 in the vehicle front-rear direction so as to extend in the vehicle front-rear direction.

Accordingly, in a case where the vehicle has a rear end collision, when a barrier (not shown) collides with a rear part of the vehicle body 11, for example, a collision load is input into the rear side members 20 from the rear bumper 68. The collision load is transmitted to the front side of the rocker 16 in the vehicle front-rear direction from the forward extending portion 70 of the rear side member 20 via the inclined extending portion 72. Further, the collision load is transmitted from the forward extending portion 70 of the rear side member 20 to the front side member 12 via the side frame 92 and the underfloor R/F 18.

That is, a load transmission passage through which the collision load is transmitted from the rear side member 20 to the rocker 16 at the time of a rear end collision of the vehicle is formed, and in addition, a load transmission passage through which the collision load is transmitted from the rear side member 20 to the underfloor R/F 18 via the side frame 92 is formed. Accordingly, the collision load is efficiently transmitted to a part in front of the battery outer case 26 in the vehicle front-rear direction.

As a result, deformation of the vehicle body 11 near the battery outer case 26 in the vehicle front-rear direction of the vehicle body 11 is restrained, so that the battery outer case 26 (or the battery accommodated therein) can be prevented or restrained from being damaged.

Particularly, the forward extending portion 70 of the rear side member 20, the side frame 92, the underfloor R/F 18 are disposed generally linearly in a bottom view of the vehicle, that is, an offset amount L1 between the forward extending portion 70 and the underfloor R/F 18 in the vehicle width direction is smaller than an offset amount L2 between the forward extending portion 70 and the rocker 16 in the vehicle width direction. Accordingly, the collision load is still more efficiently transmitted from the side frame 92 to the underfloor R/F 18.

As a result, the deformation of the vehicle body 11 near the position of the battery outer case 26 is further restrained, so that the battery outer case 26 (or the battery accommodated therein) can be further prevented or restrained from being damaged.

Further, since the load transmission passage from the rear side member 20 to the underfloor R/F 18 is formed, a collision load to be transmitted from the rear side member 20 to the rocker 16 at the time of a rear end collision of the vehicle is reduced. As a result, the rocker 16 is prevented or restrained from being broken by the load transmitted at the time of a rear end collision.

Further, a bending moment caused due to input of the collision load from the rear side in the vehicle front-rear direction at the time of a rear end collision is applied to the inclined extending portion 72 inclined outwardly in the vehicle width direction and downward in the vehicle up-down direction toward the front side in the vehicle front-rear direction in the rear side member 20. However, in the vehicle rear structure 10, the collision load to be input into the inclined extending portion 72 from the forward extending portion 70 of the rear side member 20 is reduced, so that the bending moment to be applied to the inclined extending portion 72 is restrained, thereby restraining deformation of the inclined extending portion 72. As a result, the battery outer case 26 (or the battery accommodated therein) can be prevented or restrained from being damaged.

Further, as illustrated in FIG. 1, a generally triangular part is formed, on a side portion of the vehicle body 11 in the vehicle width direction, by the vehicle frame members, i.e., the inclined extending portion 72 of the rear side member 20, the rocker 16, the first cross-member 22, and the side frame 92, in the bottom view. Accordingly, the vehicle-body rigidity (strength) in the side portion of the vehicle body 11 in the vehicle width direction improves, so that deformation of the vehicle body at the time of a side collision is restrained.

Further, since the rigidity of the vehicle body 11 is increased as such, the controllability and stability of the vehicle improves. Further, the noise, vibration, and harshness (NVH) of the vehicle also improves.

Further, the battery outer case 26 is supported by the rear side member 20 and the underfloor R/F 18 via the side frame 92. In other words, the battery outer case 26 is attached to the vehicle body 11 via the side frame 92. Accordingly, since the battery outer case 26 is attached to the vehicle body 11, it is not necessary to use a component such as a bracket separately.

Second Embodiment

Figure 7:
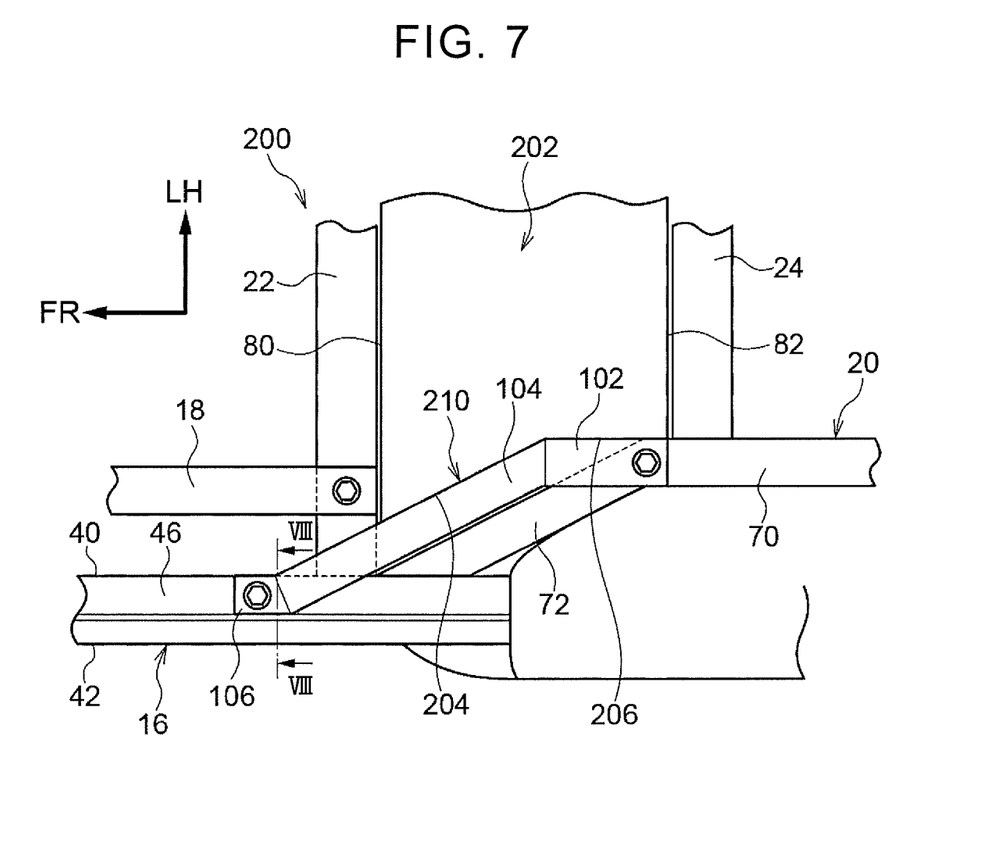
FIG. 7 is a bottom view schematically illustrating a vehicle rear structure according to a second embodiment of the disclosure and is a sectional side view.

The following describes a vehicle rear structure 200 according to the second embodiment of the disclosure with reference to FIGS. 7 to 8. Note that a constituent similar to a constituent in the first embodiment has the same reference sign as that in the first embodiment and is not described here. Further, the second embodiment is different from the first embodiment only in the shapes of the battery outer case and the side frame, and therefore, the following describes only those members.

Configuration

As illustrated in FIG. 7, a battery outer case 202 is formed such that the front wall 80 has a width larger than that of the rear wall 82 in the vehicle width direction. That is, a side wall of the battery outer case 202 is constituted by a front side wall 204 extending from a corresponding one of the opposite ends of the front wall 80 in the vehicle width direction so as to be inclined inwardly in the vehicle width direction toward the rear side in the vehicle front-rear direction, and a rear side wall 206 extending rearward in the vehicle front-rear direction from a rear end of the front side wall 204.

In the meantime, a side frame 210 includes the rear connecting portion 102, the inclined portion 104, and the front connecting portion 106, generally similarly to the side frame 92 in the first embodiment. However, the rear connecting portion 102 is connected to the front end of the forward extending portion 70 of the rear side member 20 and extends forward in the vehicle front-rear direction along the rear side wall 206.

Further, the inclined portion 104 is inclined outwardly in the vehicle width direction and inclined downward in the vehicle up-down direction toward the front side in the vehicle front-rear direction, from the front end of the rear connecting portion 102 along the front side wall 204. That is, the inclined portion 104 is inclined toward the rocker 16.

Further, as illustrated in FIGS. 7 and 8, the front connecting portion 106 is placed below the inclined wall 46 of the rocker inner panel 40 of the rocker 16 and is connected to the rocker 16.

Operation

As such, the side frame 210 is connected to the forward extending portion 70 of the rear side member 20 and is connected to the rear side of the rocker 16 in the vehicle front-rear direction. Hereby, when the vehicle has a rear end collision, a collision load can be transmitted from the forward extending portion 70 of the rear side member 20 to the rocker 16 via the inclined extending portion 72 of the rear side member 20 and the inclined portion 104 of the side frame 210. That is, since two load transmission passages are provided around the battery outer case 202, the collision load is efficiently transmitted to a part in front of the battery outer case 202 in the vehicle front-rear direction. As a result, deformation of a part of the vehicle body around the battery outer case 202 is restrained at the time of a rear end collision, and the battery outer case 202 is prevented or restrained from being damaged.

Other effects obtained when the number of load transmission passages to the front side in the vehicle front-rear direction is increased are the same as those in the first embodiment, and therefore descriptions thereof are omitted.

Further, since the battery outer case 202 is configured such that the side frames 210 are connected to the rockers 16 respectively placed in the opposite ends of the floor panel 14 in the vehicle width direction, in front of the battery outer case 202 in the vehicle front-rear direction, the width of the front wall 80 in the vehicle width direction can be made larger than that of the rear wall 82. That is, in comparison with a case where the side frame 92 is connected to the underfloor R/F 18 like the first embodiment, the capacity of the battery outer case 202 can be increased.

Further, as illustrated in FIG. 7, in the vehicle rear structure 200, the rear connecting portion 102 of the side frame 210 extends forward in the vehicle front-rear direction along the rear side wall 206 of the battery outer case 202, and therefore, the inclined portion 104 is placed in front of the inclined extending portion 72 of the rear side member 20 in the vehicle front-rear direction in a bottom view (they do not overlap with each other in a plan view). As a result, the inclined extending portion 72 of the rear side member 20, extending from the forward extending portion 70 of the rear side member 20 to the rocker 16 is prevented from interfering with the inclined portion 104 of the side frame 210.

Others

The series of embodiments describe that the side frame 92, 210 and the battery outer case 26, 202 are made of the same material, but they may be formed separately by use of different materials and integrated with each other by joining or the like.

What is claimed is:

1. A vehicle rear structure comprising:
   a battery outer case disposed on a rear side of a floor panel in a vehicle front-rear direction and below the floor panel in a vehicle up-down direction;
   a side frame provided in a side portion of the battery outer case in a vehicle width direction so as to be integrated with the battery outer case, the side frame extending forward from a rear side of the battery outer case in the vehicle front-rear direction, the side frame including an inclined portion inclined downward in the vehicle up-down direction from a rear end portion of the side frame toward a front end portion of the side frame;
   a rear bumper extending in the vehicle width direction;
   a rear vehicle frame member provided behind the battery outer case in the vehicle front-rear direction and inwardly from an end of a vehicle body in the vehicle width direction so as to extend in the vehicle front-rear direction, the rear vehicle frame member being connected to the rear end portion of the side frame in the vehicle front-rear direction, and a rear end portion of the rear vehicle frame member being connected to the rear bumper; and
   a front vehicle frame member provided in front of the battery outer case in the vehicle front-rear direction so as to extend in the vehicle front-rear direction, the front vehicle frame member being connected to the front end portion of the side frame in the vehicle front-rear direction, wherein
   the rear vehicle frame member is a rear side member includes an inclined extending portion extending inclined outwardly in the vehicle width direction and forward in the vehicle front-rear direction, a front end portion of the inclined extending portion in the vehicle front-rear direction being connected to a rear side of a rocker provided in an end of the floor panel in the vehicle width direction, and
   the inclined portion is in front of the inclined extending portion of the rear side member in the vehicle front-rear direction and the inclined portion does not overlap with the inclined extending portion a plan view.

2. The vehicle rear structure according to claim 1, wherein the front vehicle frame member is an underfloor reinforcement placed below the floor panel in the vehicle up-down direction.

3. The vehicle rear structure according to claim 1, wherein the front vehicle frame member is a rocker provided in an end of the floor panel in the vehicle width direction.

4. The vehicle rear structure according to claim 1, wherein
the rear vehicle frame member is a rear side member includes a forward extending portion provided inwardly from the end of the vehicle body in the vehicle width direction so as to extend forward in the vehicle front-rear direction from the rear bumper, a front end portion of the forward extending portion being connected to the rear end portion of the side frame in the vehicle front-rear direction, and the inclined extending portion extends from the front end portion of the forward extending portion in the vehicle front-rear direction.

5. The vehicle rear structure according to claim 4, wherein
the vehicle rear structure includes a pair of the rockers, and a cross-member having two ends is provided in front of the battery outer case in the vehicle front-rear direction, one of the two ends of the cross-member is connected to one of the rockers, and the other of the two ends of the cross-member is connected to the other one of the rockers.

6. The vehicle rear structure according to claim 1, wherein the battery outer case is attached to the vehicle body via the side frame.

7. The vehicle rear structure according to claim 1, wherein a battery is accommodated inside the battery outer case.

8. The vehicle rear structure according to claim 1, wherein a front end portion of the rear vehicle frame member is connected to the rear end portion of the side frame in the vehicle front-rear direction.

* * * * *